United States Patent [19]

Anthony et al.

[11] Patent Number: 4,574,618

[45] Date of Patent: Mar. 11, 1986

[54] LEAK DETECTION METHOD AND APPARATUS

[75] Inventors: Andrew J. Anthony, Tariffville; Richard H. Young, Canton, both of Conn.

[73] Assignee: Combustion Engineering, Inc., Windsor, Conn.

[21] Appl. No.: 612,333

[22] Filed: May 21, 1984

[51] Int. Cl.[4] .............................................. G01M 3/28
[52] U.S. Cl. .................................. 73/40.5 R; 73/46; 73/49.5
[58] Field of Search ............ 73/46, 49.8, 49.5, 40.5 R, 73/49.1; 138/90

[56] References Cited

U.S. PATENT DOCUMENTS 4,468,952  9/1984  Rathburn ............................ 73/46 X

*Primary Examiner*—Stewart J. Levy
*Assistant Examiner*—Joseph W. Roskos

[57] ABSTRACT

Repaired fluid conveying tubes are tested for leaks by isolating the repaired region from the remainder of the tube and then pressurizing the isolated region with a suitable gas. The isolation is accomplished by axial compression of one or a pair of seals which expand radially when subjected to axial force.

17 Claims, 3 Drawing Figures

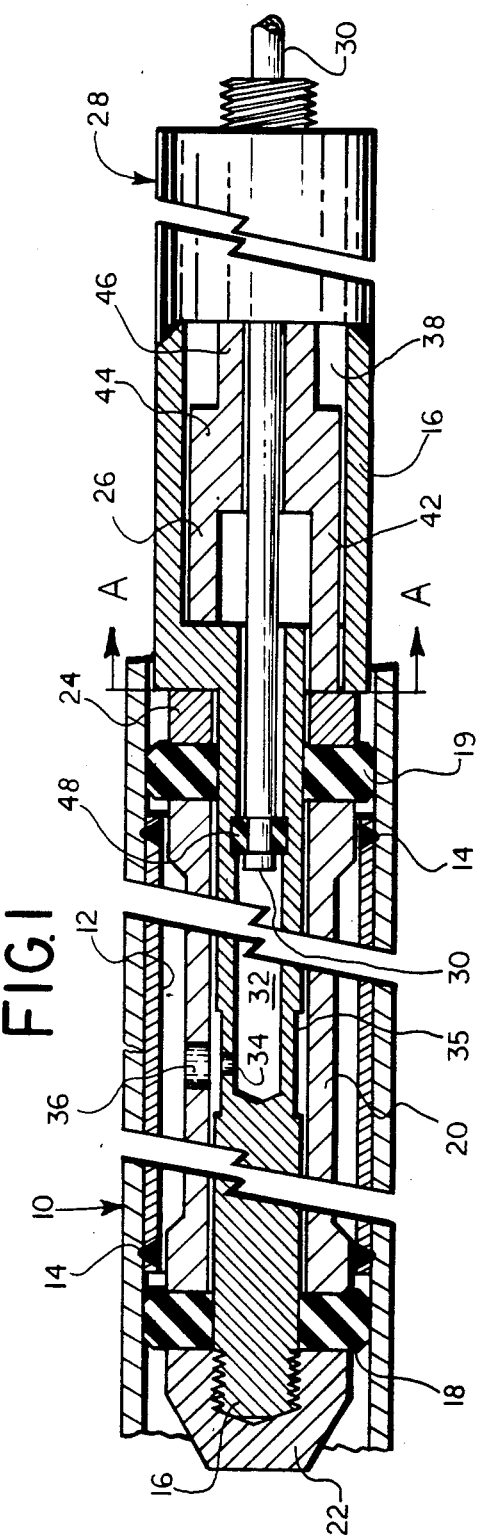
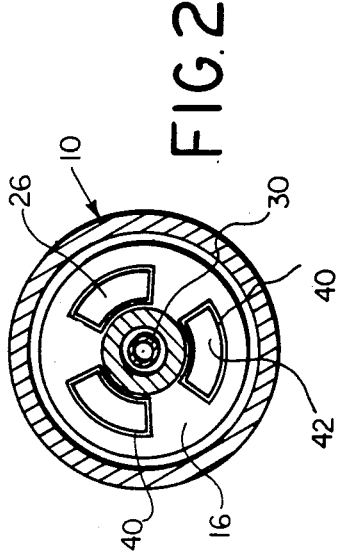

LEAK DETECTION METHOD AND APPARATUS

BACKGROUND OF THE INVENTION (1) Field of the Invention

The present invention relates to the detection of leaks in, for example, the tubes of a steam generator and particularly to ascertaining whether previously found leaks in such fluid conveying conduits have been properly repaired. More specifically, the present invention is directed to leak detectors which may be inserted in, and employed to ascertain the integrity of, fluid conveying tubes which have been repaired by means of inserting sleeves and/or plugs therein. Accordingly, the general objects of the present invention are to provide novel and improved methods and apparatus of such character.

(2) Description of the Prior Art

While not limited thereto in its utility, the present invention is particularly well-suited for employment in the testing of repaired steam generator tubes. Steam generator tube degradation is a highly publicized problem, particularly in the nuclear power field. It is often necessary, in order to overcome a leakage problem, to install repair sleeves or plugs in degraded tubes. A general discussion of the installation of sleeves and plugs in steam generator tubes may be found in U.S. Pat. No. Re. 30,802 which is assigned to the assignee of the present invention.

Regardless of the care which has been employed in the installation of a sleeve or plug, steam generator tube repair has occasionally been unsuccessful. When leakage has occurred during operation of the steam generator subsequent to repair, there has previously been no way to determine whether such leakage was caused by faulty installation of the repair sleeve or plug or by an imperfection in the sleeve or plug. This inability to ascertain the cause of leakage of a repaired steam generator tube may be attributed to the fact that there has been no technique in the prior art which permitted the repaired tube, and particularly the sleeves and plugs installed therein, to be readily checked for leakage during installation. The inability to perform a leakage test during plug or sleeve installation results, in part, from the fact that the plugs and sleeves cannot be checked from the secondary side of the steam generator because the steam generator tube may not be perforated.

An example of a connector which may be employed in a prior art leak detector, for sealing the accessible open end of a tube, may be seen by reference to U.S. Pat. No. 3,542,076. In order to employ the patented device, both ends of the tube to be tested must be accessible, the tube must be thin-walled so as to be capable of deformation by the testing apparatus, and a considerable quantity of gas or other fluid is required for the test procedure.

SUMMARY OF THE INVENTION

The present invention overcomes the above briefly discussed and other deficiencies and disadvantages of the prior art and thus provides a means for checking seal integrity of a sleeve or plug installed in a steam generator tube from the primary side of the steam generator. The present invention can be employed with sleeves or plugs which have been installed by welding, brazing or by mechanical securing techniques. In accordance with the present invention, the repaired region of a tube is internally isolated, through the use of compressed elastomeric seals, and then pressurized with a suitable gas. The existence and type of leakage of the pressurizing gas will indicate the presence and nature of any leak.

In accordance with one embodiment of the invention a pair of compressible seals are employed, the seals having a relaxed diameter which permits insertion through a sleeve which has been installed in a tube. After installation, which will respectively position the seals beyond and adjacent the opposite ends of a repair sleeve, an actuator will be employed to apply an axial compressive force to a first of the seals. The force will be transmitted via the first seal to the second seal whereby both seals will, as a result of the axial compression thereof, expand outwardly to establish fluid tight seals with the tube wall. The area between the seals is then pressurized, for example with helium gas, and a test for leakage of the helium performed.

In accordance with a second embodiment of the invention, wherein the integrity of a plugged tube is to be tested, apparatus in accordance with the invention employs a single compressible seal which is positioned in the tube "upstream" of the installed plug, the seal compressed so as to cause it to expand outwardly to establish a seal with the tube wall and the area between the seal and plug then pressurized with helium.

In both embodiments of the invention the seals are of annular configuration, are mounted on a shaft and the gas employed for the leak test is delivered via a supply tube which is coaxial with the shaft on which the seals are mounted.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a cross-sectional side elevation view of apparatus in accordance with a first embodiment of the present invention, the embodiment of FIG. 1 being employed for leak testing of tubes repaired by means of the installation of a sleeve therein;

FIG. 2 is a cross-sectional view taken along line A—A of FIG. 1; and

DESCRIPTION OF THE DISCLOSED EMBODIMENTS

Figure 3:
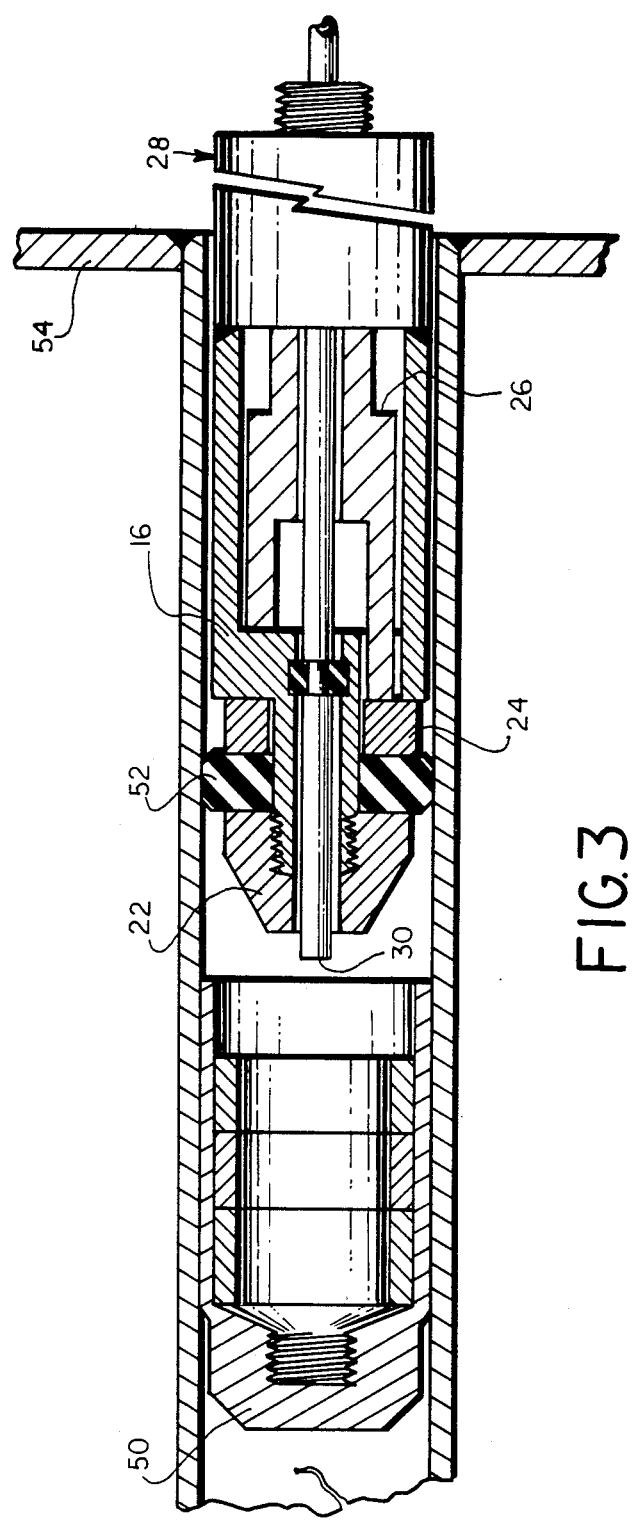
FIG. 3 is a cross-sectional side elevation view of apparatus in accordance with a second embodiment of the present invention, the embodiment of FIG. 3 being employed in the leak-testing of plugged tubes.

With reference now jointly to FIGS. 1 and 2, a steam generator tube, which has developed a leak, is indicated generally at 10. An attempt to repair tube 10 has been made by the insertion of a sleeve 12 therein, the sleeve extending in both the upstream and downstream directions with respect to the degraded area of tube 10. In the example being described sleeve 10 has been secured in place within tube 10 by means of a pair of metallurgical connections, i.e. brazes or circular welds as indicated at 14. Presuming that sleeve 12 has been properly positioned within tube 10, the leak in the tube will have been repaired unless the sleeve 12 is defective or the connections 14 are imperfect whereby there is leakage between the sleeve and tube wall.

In order to check the integrity of the repair, and it should be observed that there may be plural repair sleeves installed in a single tube, it is necessary to isolate the portion of tube 10 which includes sleeve 12 from the remainder of the tube. This isolation, however, requires the insertion in the tube of a leak detector which has the ability to pass through sleeve 12 and establish a sealing relationship with the interior of tube 10 both upstream and downstream of the sleeve. A leak detector in accordance with the invention, and having these abilities, comprises a tension shaft 16 which carries a pair of elastomer seals 18 and 19. Seals 18 and 19 are preferrably comprised of a material having an elastomeric durometer value in the range of 70 to 90. An example of a suitable material is a product sold under the trademark "METAPRENE" by Tegman Company, Philadelphia, PA. Seals 18 and 19 are depicted in FIG. 1 in the compressed, i.e., radially expanded, condition. The spacing between seals 18 and 19 is determined by a spacer cylinder 20 which is loosely received on shaft 16. The "leading" seal 18 is captured between spacer cylinder 20 and a nose cap 22. Cap 22 is threadably engaged by the free end of shaft 16 and, at the side which abuts seal 18 has a comparatively large area, flat, annular surface.

Apparatus in accordance with the embodiment of FIG. 1 also includes a backing disc 24, a push rod member indicated generally at 26, a fluidic actuator which has been indicated generally at 28, and a gas supply conduit 30. The backing disc 24 is positioned between the "trailing" seal 19 and push rod 26. Backing disc 24 is also loosely received on shaft 16 and, as is the case with cap 22, presents a flat, comparatively large annular-shaped surface area to the abutting side of seal 19. The spacer cylinder 20, at the opposite ends thereof, also presents flat surface areas to the facing surfaces of seals 18 and 19.

As may be seen from FIG. 1, shaft 16 has a first smaller diameter portion, extending from the threaded end which engages cap 22, and a second larger diameter portion which, in the disclosed embodiment, is adjacent to the surface of backing disc 24 which faces away from seal 19. The "free" end of the larger diameter portion of shaft 16 is affixed, for example by welding, to actuator 28. The smaller diameter portion of shaft 16 is provided with an axial bore 32. Bore 32 extends part way along the length of the tension shaft small diameter portion as shown. One or more radially oriented passages 34 provide fluid communication between the exterior surface of shaft 16 and bore 32. The discharge ends of radial passages 34 may be located in a circumferential groove 35 provided in the outer surface of shaft 16 as shown. The spacer cylinder 20 is also provided with one or more radially oriented passages, as indicated at 36, which extend through cylinder 20. The passage or passages 36 in cylinder 20 are located so as to be in registration with the circumferential groove 35 in the smaller diameter portion of shaft 16.

The larger diameter portion of shaft 16 is formed so as to define an axial chamber 38 which receives push rod 26. As may be seen from FIG. 2, the portion of shaft 16 in the vacinity of the shoulder, i.e., the portion at the junction between the smaller and larger diameter portions of shaft 16, is provided with a plurality of generally arcuately shaped apertures 40 which extend between chamber 38 and the space to the exterior of the smaller diameter portion of shaft 16 which is occupied by disc 24. The push rod 26 is provided with a plurality of arms 42 which are sized and shaped to extend through apertures 40 so as to contact backing disc 24. The main body portion 44 of push rod 26 is provided with an axial passage through which the gas supply conduit 30 extends. The outer diameter of the gas supply conduit 30 will be less than the diameter of the axial passage in push rod body portion 44 so that the push rod will be capable of axial movement relative to conduit 30. In the embodiment of FIGS. 1 and 2, body portion 44 of push rod 26 defines an extension 46 of the piston rod of the actuator 28, the actuator typically comprising a hydraulic cylinder and included piston.

The gas supply conduit 30 extends part way into passage 32 in shaft 16. A fluid tight seal 48, for example a compressed O-ring received in a pair of facing grooves, is provided between the outer diameter of conduit 30 and the wall of passage 32.

The leak detection apparatus of the present invention, as described above, may be inserted in a repaired steam generator tube to the desired location since the maximum diameter of the apparatus is less than the minimum diameter of the repaired tube, i.e., a tube which has had one or more sleeves installed therein. The nose cap 22 is shaped so as to lead the device through a sleeve when encountered. The nose cap 22, tension shaft 16, actuator 28 and supply conduit 30 define a unitary structure. Within this unitary structure, and relatively axially movable with respect thereto, are situated the push rod 26, backing disc 24, spacer cylinder 20 and, of course, the seals 18 and 19. The spacing between seals 18 and 19 may be adjusted within limits by the provision of replacement spacer cylinders 20 and different configuration nose caps 22. As shown in FIG. 1, the seals 18 and 19 are spaced apart by the maximum axial distance.

In use, when the leak detector has been positioned as shown relative to an installed repair sleeve, the cylinder of actuator 28 is pressurized thus causing its piston rod to be extended and the arms 42 of push rod 26 to urge backing disc 24 toward nose cap 22. The backing disc 24 will act against seal 19 thus compressing this seal. The axial load is transmitted through seal 19 into spacer cylinder 20 which, in turn, acts on seal 18 to urge seal 18 against cap 22 thereby compressing seal 18. The application of axial force to annular seals 18 and 19 causes radial expansion thereof whereupon fluid tight mechanical connections are established between the seals and the wall of the steam generator tube 10 and between the seals and the outer diameter of tension shaft 16. Thus, the compression of seals 18 and 19 will isolate the length of tube 10 which extends therebetween from the remainder of the tube. The isolated length of tube 10 will include the installed repair sleeve 12. With seals 18 and 19 in the compressed condition as shown, the region between the seals is pressurized with helium at a slight positive pressure via the conduit 30. If the sleeve is not completely sealed to the wall of the tube by means of the welds 14, and the steam generator tube is preforated in the region of sleeve 12, the region between seals 18 and 19 will not hold pressure when the supply of helium is terminated. If the region holds pressure, and the sleeve leaks at either end, helium will be trapped between the sleeve and the steam generator tube. After the leak detector of the present invention has been removed, a helium sniffer may be used to determine if there has been leakage between the sleeve and steam generator tube.

It is to be noted that very long repair sleeves may be tested by employing the FIG. 1 embodiment at each end of the sleeve, i.e., one of the compressible seals of the apparatus will be inserted in the sleeve while the other seal will cooperate with the tube as shown.

The embodiment of FIG. 3 may be employed to test for leaks in tubes which, because of their deteriorated condition, have had a plug 50 installed therein. The embodiment of FIG. 3 differs from that of FIGS. 1 and 2 primarily in the fact that it employs only a single compressible seal 52 and the gas supply conduit 30 extends the entire length of the tension shaft 16 and through the end cap 22. The FIG. 3 embodiment is installed in the steam generator tube 10 at the tube sheet face 54, the actuator 28 energized to cause radial expansion of seal 52 by compressing the seal between end cap 22 and backing disc 24, and the section of tube 10 between plug 50 and seal 52 then pressurized with helium. If the plug 50 leaks it will not be possible to maintain pressure between the plug and seal 52.

A pair of the FIG. 3 embodiments can be used to test an unplugged tube for leakage if both ends of the tube are readily accessible.

As should now be obvious to those skilled in the art, the present invention has the attributes of ease of use, reliability, minimal consumption of helium or other test gas and distortion of the tube to be tested is unnecessary.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. Apparatus for the non-destructive testing of the integrity of a tubular member without modification of such member comprising:

fluidic actuator means, said actuator means including a housing and having a reciprocal output member;

elongated push rod means operated by said actuator means output member;

means defining an extension of said actuator means housing, said extension defining means being coaxial with said push rod means, said extension defining means being of greater length than said push rod means and including:

a first generally tubular portion affixed at a first end thereof to said actuator means housing;

a second portion coaxial with said first portion, said second portion having a smaller diameter than said first portion; and a third portion intermediate said first and second portions, said third portion interconnecting said first and second portions, said third portion being provided with at least a first aperture which extends between the interior of said first portion and the exterior of said second portion, said push rod means extending through said aperture;

stop means mounted on said extension defining means second portion at a position which is disposed away from said actuator means by a distance greater than the length of said push rod means;

first resilient seal means mounted on said extension defining means second portion in abutting relationship to said stop means, said first seal means expanding radially in response to a compressive force, said first seal means having a relaxed diameter which is less than the inner diameter of a tubular member to be tested, said first seal means being engaged by said push rod means to selectively cause compression thereof between said push rod means and said stop means; and means for supplying a pressurized gas to the region of the tubular member to be tested, the test region being isolated from the remainer of the tubular member by compression of said first seal means.

2. The apparatus of claim 1 wherein said pressurized gas supplying means extends through said extension defining and stop means.

3. The apparatus of claim 1 wherein said seal means is generally of annular shape, is in sealing relationship to said extension defining means second portion at its inner diameter, and is comprised of a material having an elastomeric durometer value in the range of 70 to 90.

4. The apparatus of claim 3 wherein said pressurized gas supplying means extends through said extension defining and stop means.

5. The apparatus of claim 1 wherein said push rod means comprises:

an elongated member coupled at a first end to said actuator means output member, said elongated member extending through said aperture in said extension defining means shoulder portion; and an aperture plate member positioned about and movable relative to said extension defining means second portion, said plate member being located intermediate said first seal means and the second end of said elongated member.

6. The apparatus of claim 5 wherein said pressurized gas supplying means extends through said extension defining means first, second and third portions and is coaxial therewith, said gas supplying means also extending through said stop means.

7. The apparatus of claim 6 wherein said seal means is generally of annular shape, is in sealing relationship to said extension defining means second portion at its inner diameter, and is comprised of a material having an elastomeric durometer value in the range of 70 to 90.

8. Apparatus for the non-destructive tesing of the integrity of a tubular member without modification of such member comprising:

fluidic actuator means, said actuator means including a housing and having a reciprocal output member;

elongated push rod means being operated by said actuator means output member, said push rod means including:

first force transmitting means coupled to said actuator means output member; and second force transmitting means which is separate from and a least in part aligned with said first force transmitting means, said second force transmitting means being movable relative to said first force transmiting means;

means defining an extension of said actuator means housing, said extension defining means being coaxial with said push rod means first and second force transmitting means, said extension defining means being of greater length than said push rod means, said second force transmitting means being mounted on said extension defining means and being movable with respect thereto;

stop means mounted on said extension defining means at a position which is disposed away from said actuator means by a distance greater than the length of said push rod means;

first resilient seal means mounted on said extension defining means between said first and second force transmitting means, said first seal means expanding radially in response to a compressive force, said first seal means having a relaxed diameter which is less than the inner diameter of a tubular member to be tested, said first seal means being engaged by said push rod means first force transmitting means;

second resilient seal means mounted on said extension defining means in abutting relationship to said stop means, said second seal means expanding radially in response to a compressive force, said second seal means having a relaxed diameter which is less than the inner diameter of a tubular member to be tested, compressive force being delivered to said second seal means via said first seal means and said push rod means second force transmitting means, operation of said acuator means causing compression and radial expansion of said first and second seal means whereby the interior of the tubular member in the region between said first and second seal means is isolated from the remainder of the tube interior; and means for supplying a pressurized gas to the region between said first and second seal means.

9. The apparatus of claim 8 wherein said seal means are generally of annular shape, are spaced apart in sealing relationship to said extension defining means at their inner diameter when in the compressed state, and are comprised of a material having an elastomeric durometer value in the range of 70 to 90.

10. The apparatus of claim 8 wherein said pressurized gas supplying means extends through said first force transmitting means and partly through said extension and second force transmitting means.

11. The apparatus of claim 10 wherein said pressurized gas supplying means includes:

means defining a gas supply passage which is coaxial with said extension defining means, said coaxial passage terminating at its downstream end intermediate said seal means; and means defining a generally radially oriented gas supply passage which communicates at a first end with said coaxial passage, said generally radially oriented passage extending through said second force transmitting means and partly through said extension defining means.

12. The apparatus of claim 11 wherein said second force transmitting means is a tubular member and is provided with a groove in its outer surface, said groove defining an annular chamber, the second end of said generally radially oriented passage being disposed in said groove.

13. The apparatus of claim 11 wherein said seal means are generally of annular shape, are spaced apart in sealing relationship to said extension defining means at their inner diameter when in the compressed state, and are comprised of a material having an elastomeric durometer value in the range of 70 to 90.

14. The apparatus of claim 8 wherein said extension defining means comprises:

a first generally tubular portion affixed at a first end thereof to said actutator means housing;

a second portion coaxial with said first portion, said second portion having a smaller diameter than said first portion, said second force transmitting means and said first and second seal means being mounted on said second portion; and a third portion intermediate said first and second portions, said third portion interconnecting said first portion to said second portion and being provided with at least a first aperture which extends between the interior of said first portion and the exterior of said second portion, said first force transmitting means extending through said aperture.

15. The apparatus of claim 14 wherein said first force transmitting means comprises:

an elongated member coupled at a first end to said actuator output member, said elongated member extending through said aperture in said extension defining means third portion; and an apertured plate member positioned about and movable relative to said extension defining means second portion, said plate member being located between said first seal means and the second end of said elongated member.

16. The apparatus of claim 15, wherein said pressurized gas supplying means comprises:

means defining a gas supply passage which is coaxial with said extension defining means, said coaxial passage terminating at its downstream end intermediate said first and second seal means; and means defining a generally radially oriented gas supply passage which communicates at a first end with said coaxial passage, said generally radially oriented passage extending through said second force transmitting means and partly through said extension defining means second portion.

17. The apparatus of claim 16 wherein said seal means are generally of annular shape, are in sealing relationship to said extension defining means second portion when in the compressed state, and are comprised of an elastomeric material having a durometer value in the range of 70 to 90.

* * * * *